Figure 1:
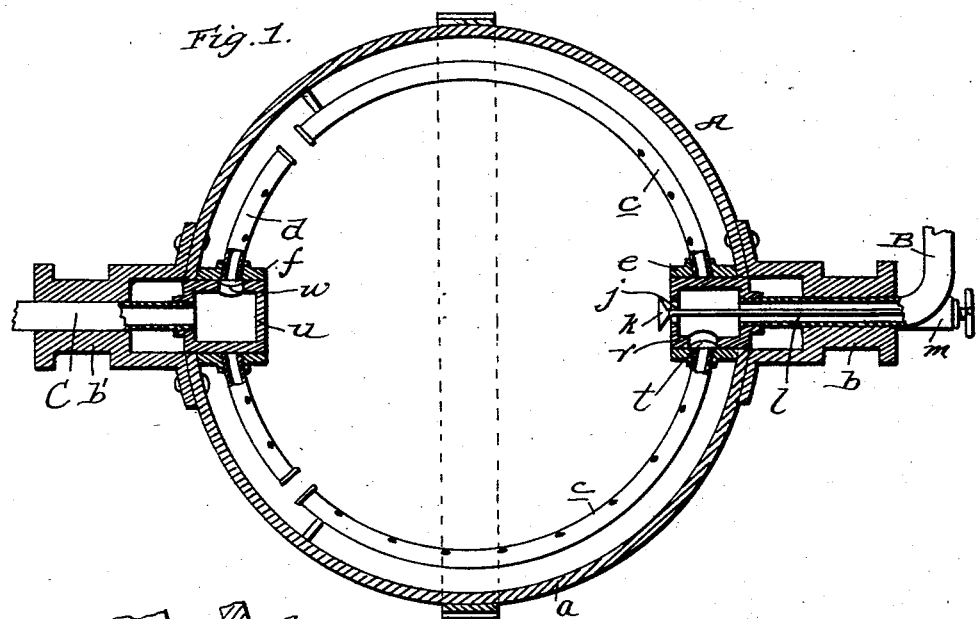

(No Model.)

M. D. KEENEY.
PAPER STOCK COOKER.

No. 570,641. Patented Nov. 3, 1896.

Witnesses:

Inventor
M. D. Keeney
By James J. Sheehy
Attorney

UNITED STATES PATENT OFFICE.

MARBLE D. KEENEY, OF ANTIOCH, CALIFORNIA.

PAPER-STOCK COOKER.

SPECIFICATION forming part of Letters Patent No. 570,641, dated November 3, 1896.

Application filed January 18, 1896. Serial No. 575,967. (No model.)

*To all whom it may concern:*

Be it known that I, MARBLE D. KEENEY, a citizen of the United States, residing at Antioch, in the county of Contra Costa and State of California, have invented certain new and useful Improvements in Paper-Stock Cookers; and I do declare the following to be a full, clear, and exact description of the invention, such as will enable others skilled in the art to which it appertains to make and use the same.

My invention relates to paper-stock cookers; and, in common with the cooker disclosed in my prior application filed July 17, 1895, and serially numbered 556,248, it has for its general object to provide a cooker by which paper-stock may be cooked with low-pressure steam as quickly and as thoroughly, if not more quickly and thoroughly, than has heretofore been done with high-pressure steam, and this without blackening the paper-stock and without weakening the fiber thereof.

To the attainment of the foregoing ends, the present invention consists broadly of a closed paper-stock cooker having a continuously-open induction-passage and a continuously-open eduction-passage for steam.

The invention also consists of a closed paper-stock cooker having a continuously-open induction-passage and a continuously-open eduction-passage for steam, means for conducting a portion of the steam from the induction-opening into the stock, and means for discharging a portion of the steam which enters the cooker directly into the space above the stock, so as to render the mass of stock much hotter and maintain a high degree of heat and thus accelerate the cooking of the stock, so that such cooking may be accomplished in less time than heretofore.

The invention further consists of a rotary cooker having continuously-open induction and eduction passages or openings, conduits for conducting the steam admitted through the inlet-passage into the stock, conduits for conducting the steam from the interior of the cooker, above the stock, to the discharge opening or passage, a valve device adapted to effect communication between the inlet passage or opening and each of the conduits leading the steam to the stock when said conduits are passing through the stock, and also adapted to close communication between the inlet-opening and each of the conduits when said conduits are above or out of the stock, and a valve device adapted to effect communication between the outlet-opening and each of the conduits for conducting the steam from the interior of the cooker when said conduits are above or out of the stock, and also adapted to close communication between the outlet-opening and each of the latter-named conduits when said conduits are in the stock, whereby the steam is enabled to pass continuously and without cessation through the cooker and is carried through the stock while the same is in a state of agitation.

The invention further consists of a rotary cooker having continuously-open induction and eduction passages or openings, conduits for conducting the steam admitted through the inlet-passage into the stock, conduits for conducting the steam from the interior of the cooker above the stock to the discharge opening or passage, means adapted to effect communication between the inlet passage or opening and each of the conduits leading the steam to the stock when said conduits are passing through the stock and also adapted to close communication between the inlet-opening and each of the conduits when said conduits are above or out of the stock, means for effecting direct communication between the induction-passage and the interior of the cooker above the stock, and means adapted to effect communication between the outlet-opening and each of the conduits for conducting the steam from the interior of the cooker when said conduits are above or out of the stock and also adapted to close communication between the outlet-opening and each of the latter-named conduits when said conduits are in the stock, whereby the steam is enabled to pass continuously and without cessation through the stock and through the cooker above the stock.

The invention still further consists in the peculiar construction, novel combination, and adaptation of parts hereinafter described, and particularly pointed out in claims appended.

Figure 2:
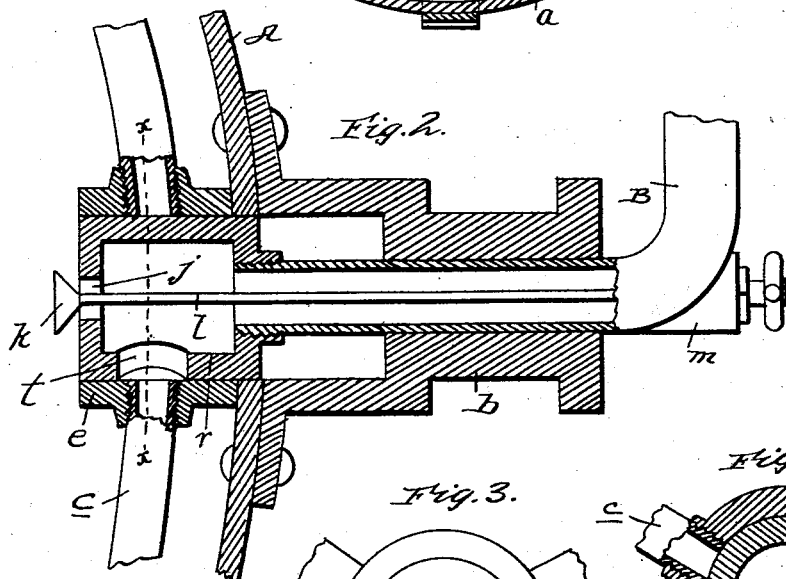
Figure 3:
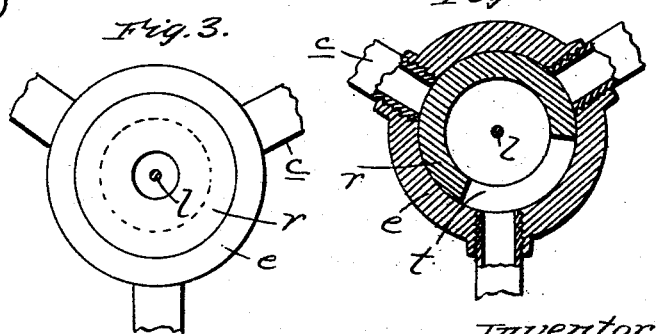
Figure 4:
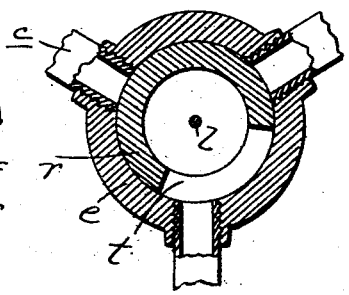

In the accompanying drawings, Figure 1 is a vertical diametrical section of a rotary paper-stock cooker embodying my invention. Fig. 2 is a detail section on an enlarged scale, illustrating the valve devices for effecting communication between the induction-opening and the conduits or pipes for leading steam into the stock and between said induction-opening and the interior of the cooker above the stock. Fig. 3 is an elevation of the inner end of the head to which the conduits for carrying steam into the stock are connected; and Fig. 4 is a detail section of said head, taken in the plane indicated by the line $x\ x$ of Fig. 2.

In the said drawings similar letters designate corresponding parts in all of the views.

Any suitable form or construction of cooker embodying my invention may be employed; but as experience has demonstrated that rotary cookers are the best I prefer to employ such a cooker and one embodying the construction illustrated in the drawings. The cooker A illustrated is of a general spherical form, and it comprises the hollow body $a$, the hollow trunnions $b\ b'$ to receive the feed and discharge pipes B C, the three (more or less) preferably perforated pipes $c$, which are connected and adapted to move with the body and are designed to lead the steam from the pipe B into the stock in the cooker, the three (more or less) preferably perforated pipes $d$, which are also connected and adapted to move with the body and are adapted to lead steam from the interior of the cooker to the pipe or conduit C, the hollow cylinder $e$, which is connected to the pipes $c$, and the hollow cylinder $f$, which is connected to the pipes or conduits $d$.

$r$ indicates a hollow stationary valve which is connected to and communicates with the pipe B. This valve $r$ is arranged within the hollow cylinder $e$, and it is provided with the opening $t$, which is designed to register with the pipes $c$ when they come opposite the same, and is arranged, as shown, for a purpose presently described. The said stationary valve $r$ is further provided in its inner end with the preferably centrally-arranged aperture $j$. This aperture or conduit $j$ is designed to conduct steam into the interior of the cooker above the stock for a purpose presently described, and it may be closed when desired by a valve $k$, which is preferably of a cone shape, as illustrated, so as to enable it when in its open position, as shown in Fig. 2, to spread or distribute the steam that comes through the aperture $j$. The valve $k$ serves to close the aperture $j$ while the cooker is being charged with stock, and it may be operated, i. e., opened and closed, by any suitable means. I prefer, however, to mount it upon a stem $l$ and carry said stem through a stuffing-box $m$ of the pipe B and provide it with threads and with a handle at its outer end in a manner common to reciprocating valves.

$u$ indicates a hollow stationary valve which is connected to and communicates with the pipe C. This valve $u$ is arranged within the hollow cylinder $f$, and it is provided with the opening $w$, which is designed to register with the pipes $d$ when they come opposite the same and is arranged, as illustrated in Fig. 1, for a purpose hereinafter to be described.

The valve device $r$, in virtue of its construction and arrangement, is adapted to effect communication between the pipe B and each of the pipes $c$ when said pipes are in the stock, and is also adapted to close communication between the pipe B and each of the pipes $c$ when said pipes are above or out of the stock. On the other hand, the valve device $u$, by reason of its construction and arrangement, is adapted to effect communication between the pipe C and each of the pipes $d$ when said pipes are above or out of the stock, and is also adapted to close communication between the pipe C and each of the pipes $d$, when said pipes are in the stock.

As will be readily observed, the construction just described affords a continuous passage for the steam through the cooker, which is an essential feature of my invention, and at the same time steam is compelled to pass through the stock.

The steam which is carried into the stock by the perforated pipes $c$ is condensed and to a certain extent cooled by its contact with the stock, but this cooling of such steam is more than counteracted by the steam which passes directly in its highly-heated state through the aperture $j$ into the interior of the cooker above the water-line or above the stock therein. This highly-heated steam, as will be readily appreciated, will maintain a high degree of temperature in the cooker and will keep the stock very hot, and will consequently materially accelerate the cooking, so that it may be accomplished in much less time than has heretofore been required to cook the same quantity of stock.

It is desirable not to diminish the volume of steam which is passed through the pipes $c$ into the stock, that is to say, the volume of steam which is passed through the pipes $c$ and into the stock should be the same that is ordinarily passed through the distributing-pipes of paper-stock cookers of this class. In consequence of this the volume of steam which is fed through the pipe B should be greater in volume than usually employed in low-pressure cookers, in order to afford an ample supply for the pipes $c$ to conduct into the stock and an ample supply to be discharged through the aperture $j$ into the space above the stock or above the water-line. This increase in the volume of steam fed into the cooker renders it desirable to enlarge the eduction-pipe C in proportion to the said increase, and the apertures in the pipes $d$ may also be enlarged, if desired, in order that a great volume of steam may be passed through the cooker in a short space of time and the cooking be thereby further accelerated. It is desirable, however, to enlarge the pipe C only when the increased volume of steam is employed and the valve $k$ is open. When the ordinary volume of steam is employed, the pipe C may be the same size as the pipe B, or may be reduced, as compared with said pipe B, or may be adapted in any other suitable manner to retard the escape of steam from the cooker.

In the practice of the invention I maintain a steam-pressure of from eighty (80) to one hundred (100) pounds in a generator, (not illustrated,) and may use this steam to actuate an engine, (also not illustrated,) as described in my aforesaid prior application. After actuating the engine the steam is passed continuously and without cessation through the pipe B and the cooker, through and above the stock, as described, and out through the pipes $d$ and C and serves to cook the stock. For ordinary purposes a pressure of about five pounds (that is to say, five pounds plus the atmospheric pressure) is maintained in the cooker A. With such a pressure in a cooker such as described I am enabled to cook stock in the same time or less than the same time and as thoroughly, if not more thoroughly, than is done at present with forty pounds of steam taken direct from a generator, and this without using any chemicals that are not used when the high-pressure steam is employed, and without blackening, burning, or weakening the fiber, which are objectionable incidents of the use of high-pressure steam. I am also enabled with the cooker described to cook the stock with the same pressure of steam in less time than such cooking can be accomplished in the cooker disclosed in my aforesaid prior application, and I am also enabled with my improved cooker to not only thoroughly cook the stock, but also change its form, that is to say, reduce it to fiber so fine that it can be handled with a pump in the same manner that pulp is handled.

When desired, low-pressure steam may be taken from a generator and fed to my improved cooker without being utilized to actuate an engine or for any other purpose intermediate of the generator and cooker.

Having described my invention, what I claim is—

1. A rotary closed paper-stock cooker having a continuously-open induction passage or opening and a continuously-open eduction passage or opening for steam, substantially as specified.

2. A closed paper-stock cooker having a continuously-open induction passage or opening and a continuously-open eduction passage or opening for steam, conduits for conducting a portion of the steam from the induction-opening into the stock, and a conduit for conveying or discharging a portion of the steam, from the induction passage or opening, directly into the space above the stock, so as to render the mass of stock much hotter and maintain a high degree of heat in the cooker and thus accelerate the cooking of the stock, substantially as specified.

3. A rotary paper-stock cooker having continuously-open induction and eduction passages or openings, conduits for conducting the steam admitted through the inlet-passage into the stock, conduits for conducting the steam from the interior of the cooker to the discharge opening or passage, a valve device adapted to effect communication between the inlet passage or opening and each of the conduits for leading the steam to the stock, when said conduits are passing through the stock, and also adapted to close communication between the inlet-opening and each of the conduits, when said conduits are above or out of the stock, and a valve device adapted to effect communication between the outlet-opening and each of the conduits for conducting the steam from the interior of the cooker, when said conduits are above or out of the stock, and also adapted to close communication between the outlet-opening and each of the latter-named conduits, when said conduits are in the stock substantially as and for the purpose set forth.

4. A rotary paper-stock cooker having continuously-open induction and eduction passages or openings for steam, conduits for conducting the steam admitted through the inlet-passage into the stock, conduits for conducting the steam from the interior of the cooker above the stock to the discharge opening or passage, a valve device adapted to effect communication between the inlet opening or passage and each of the conduits for leading steam into the stock, when said conduits are passing through the stock, and also adapted to close communication between the inlet opening or passage and each of said conduits, when the conduits are above or out of the stock, a conduit for effecting direct communication between the induction passage or opening and the interior of the cooker above the stock, and a valve device adapted to effect communication between the outlet-opening and each of the conduits for conducting the steam from the interior of the cooker, when said conduits are above or out of the stock, and also adapted to close communication between the outlet-opening and each of the latter-named conduits, when said conduits are in the stock, whereby the steam is enabled to pass continuously and without cessation through the stock and through the cooker above the stock, substantially as specified.

5. A rotary paper-stock cooker comprising the hollow body having the hollow trunnions, conduits movable with the hollow body and adapted to lead steam into the stock, conduits also movable with the hollow body and adapted to lead steam out of the cooker, a hollow cylinder $e$, connected and adapted to move with the first-named series of pipes, a hollow cylinder $f$, connected and adapted to move with the second-named series of pipes, the steam-inlet pipe, the hollow, stationary valve connected with the steam-inlet pipe and arranged within the cylinder $e$, and having the peripheral aperture $t$, adapted to communicate with the pipes c, and also having the aperture j, in its inner end, a valve for controlling the passage of steam through said aperture j; the aperture t, of the valve being so arranged as to effect communication between the steam-inlet pipe and the conduits for leading steam into the stock, when said conduits are in the stock and close communication between the inlet-pipe and said conduits when the conduits are above or out of the stock, the steam-discharge pipe, and the hollow stationary valve connected with the steam-discharge pipe and arranged within the cylinder f, and having the peripheral aperture w, adapted to communicate with the pipes d; the said aperture w, being so arranged as to effect communication between the steam-discharge pipe and the conduits for leading steam out of the stock, when said conduits are above the stock, and close communication between the steam-discharge pipe and the conduits when the conduits are in the stock, substantially as and for the purpose specified.

6. A rotary closed paper-stock cooker having a continuously-open induction passage or opening and an eduction passage or opening for steam; the said eduction opening or passage being continuously open to the atmosphere, substantially as and for the purpose set forth.

In testimony whereof I affix my signature in presence of two witnesses.

MARBLE D. KEENEY.

Witnesses:
EDGAR F. OLSON,
J. D. TROW.